(12) United States Patent
Nachbargauer

(10) Patent No.: US 8,746,665 B2
(45) Date of Patent: Jun. 10, 2014

(54) DRIVE APPARATUS HAVING A FORCE TRANSMISSION MEANS THAT CAN BE MOVED BY GRAVITATIONAL FORCE

(75) Inventor: Kurt Nachbargauer, Baden-Baden (DE)

(73) Assignee: IHT Automation GmbH & Co. KG, Baden-Baden (DE)

( * ) Notice: Subject to any disclaimer, the term of this patent is extended or adjusted under 35 U.S.C. 154(b) by 705 days.

(21) Appl. No.: 12/736,685

(22) PCT Filed: Apr. 2, 2009

(86) PCT No.: PCT/EP2009/053943
§ 371 (c)(1),
(2), (4) Date: Oct. 29, 2010

(87) PCT Pub. No.: WO2009/144063
PCT Pub. Date: Dec. 3, 2009

(65) Prior Publication Data
US 2011/0041631 A1 Feb. 24, 2011

(30) Foreign Application Priority Data
May 26, 2008 (DE) .......................... 10 2008 025 076

(51) Int. Cl.
*B25B 1/20* (2006.01)
*B23K 7/10* (2006.01)
*H02P 5/00* (2006.01)
*H02P 5/46* (2006.01)
*H02P 7/08* (2006.01)
*F16H 19/04* (2006.01)

(52) U.S. Cl.
USPC .................................. 269/43; 266/76; 318/67

(58) Field of Classification Search
USPC .................. 269/43; 318/687; 192/20; 266/76; 369/210
See application file for complete search history.

(56) References Cited

U.S. PATENT DOCUMENTS 2,527,586 A * 10/1950 Koehlinger ................... 369/231
3,435,932 A   4/1969 Anderes
(Continued)

FOREIGN PATENT DOCUMENTS

| DE | 1 602 928  | 4/1970 |
| DE | 198 49 384 | 5/2000 |
| FR | 2 622 945  | 5/1989 |

OTHER PUBLICATIONS

International Search Report.
(Continued)

*Primary Examiner* — Lee D Wilson
*Assistant Examiner* — Alvin J. Grant
(74) *Attorney, Agent, or Firm* — Collard & Roe, P.C.

(57) ABSTRACT

The invention relates to a drive apparatus (10) for the linear movement of a processing tool with respect to a workpiece, having a tool holder (18) which is fixed on a carriage (16) and is intended for the fastening of the processing tool, having a stationary guide device (12) in which the carriage (16) is guided such that it can be displaced in a vertically linear manner, and having a drive device (42) with a first force transmission means (46) which, in an engaged position, engages with a second force transmission means (40) connected to the carriage (16) in order to move the carriage (16). According to the invention, it is provided that the drive device (42) is mounted in the guide device (12) such that it can be moved between a release position, in which the force transmission means (40, 46) do not engage with one another, and the engaged position in such a way that the gravitational force of the drive device (42) causes a movement from the release position into the engaged position.

20 Claims, 3 Drawing Sheets

(56) References Cited

U.S. PATENT DOCUMENTS

Figure 1:
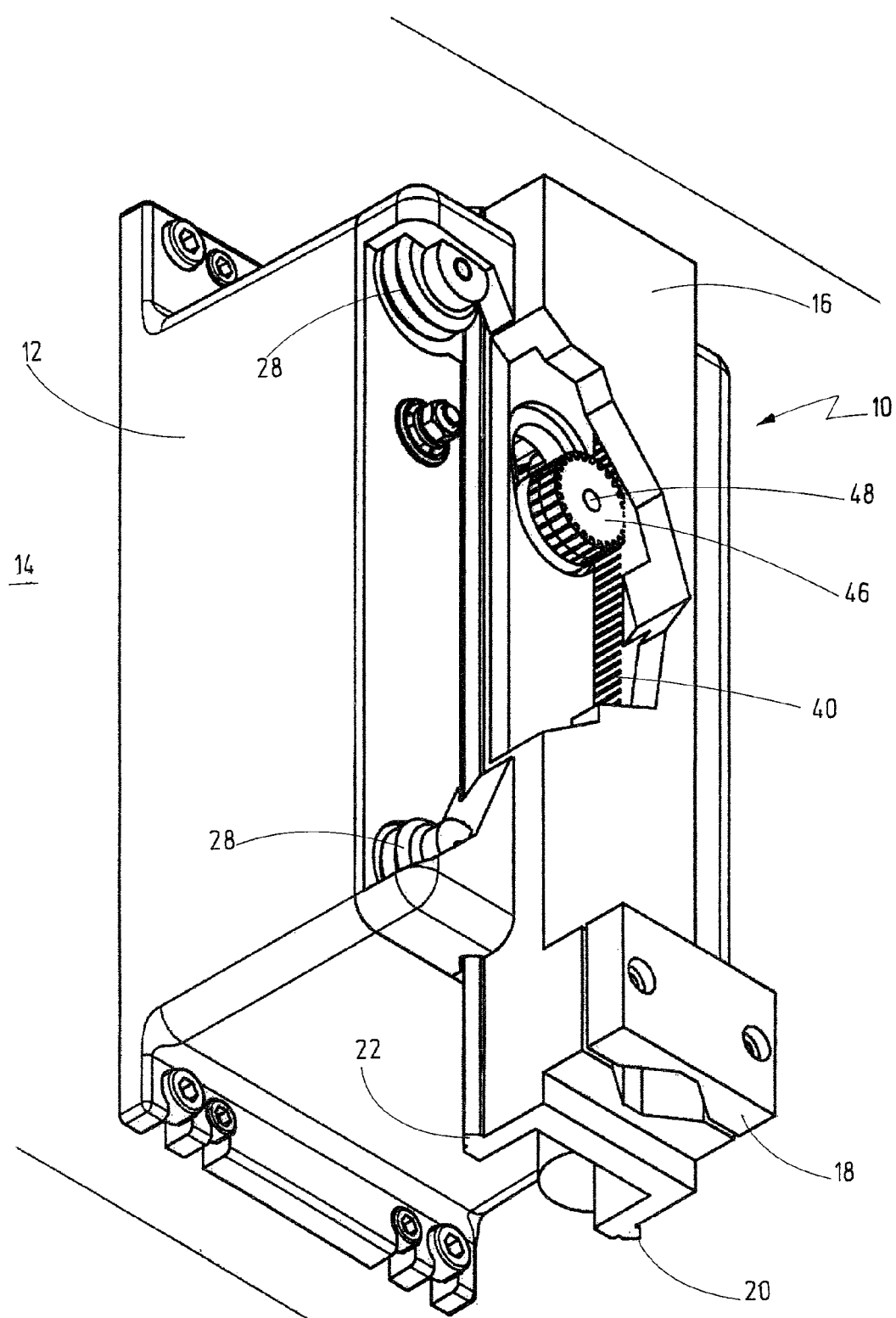

| | | | | |
|---|---|---|---|---|
| 3,794,332 | A | * | 2/1974 | Bailey .................... 369/210 |
| 3,970,232 | A | * | 7/1976 | Melton ...................... 228/7 |
| 4,013,277 | A | * | 3/1977 | Schmitt ..................... 266/76 |
| 4,415,795 | A | * | 11/1983 | Ross et al. ............ 219/121.44 |
| 4,417,801 | A | * | 11/1983 | Eisemann ................. 399/408 |
| 4,500,235 | A | * | 2/1985 | Johnsen ................... 408/238 |
| 4,727,642 | A | | 3/1988 | Christner et al. |
| 4,836,345 | A | | 6/1989 | Anderson |
| 5,302,045 | A | * | 4/1994 | Johnsen ................... 403/322.1 |
| 5,542,769 | A | * | 8/1996 | Schneider et al. .......... 400/225 |
| 5,664,762 | A | * | 9/1997 | Rothbauer ................. 254/103 |
| 5,989,485 | A | * | 11/1999 | Staacks et al. .............. 266/76 |
| 6,239,573 | B1 | | 5/2001 | Schmall |
| 7,131,361 | B2 | * | 11/2006 | Nakajima ................... 83/100 |
| 7,685,885 | B2 | * | 3/2010 | Cowgill ..................... 73/828 |
| 8,132,837 | B2 | * | 3/2012 | Pedrazzini ................. 294/86.4 |
| 8,390,219 | B2 | * | 3/2013 | Houser ...................... 318/255 |

OTHER PUBLICATIONS

German Search Report dated Mar. 4, 2009 with English translation of relevant parts.

* cited by examiner

DRIVE APPARATUS HAVING A FORCE TRANSMISSION MEANS THAT CAN BE MOVED BY GRAVITATIONAL FORCE

CROSS REFERENCE TO RELATED APPLICATIONS

This application is the National Stage of PCT/EP2009/053943 filed on Apr. 2, 2009, which claims priority under 35 U.S.C. §119 of German Application No. 10 2008 025 076.7 filed on May 26, 2008, the disclosure of which is incorporated by reference. The international application under PCT article 21(2) was not published in English.

The invention relates to a drive apparatus for the linear movement of a processing tool with respect to a work piece, in accordance with the embodiments described herein.

Known devices of this type serve to set the distance of a tool, such as a plasma cutting torch, relative to a work piece to be processed. Setting the distance is necessary in order to optimize the processing, for example in order to obtain an optimal cut. In this connection, the processing tool, mounted on a carriage, is first moved toward the work piece until it sits on the latter, by means of moving the carriage in a guide device. Contact of the tool with the work piece is detected by means of a tactile sensor affixed to the tool tip. When the tool sits on the work piece, the drive device stops the movement of the tool and subsequently lifts it off the work piece again. The displacement path away from the work piece is measured by means of a path measurement unit, so that during the subsequent processing process, the distance between tool and work piece can be kept constant, for example in defined manner. The tactile sensor is connected with the drive device by way of a cable. In this connection, it is considered disadvantageous that in the event of a repair or a replacement of the tool, or of the tool holder that fixes the tool in place, the cable also has to be disconnected. Also, due to the movement of the tool relative to the drive device, the cable is subject to increased wear. Furthermore, it is considered to be disadvantageous that the tool can be moved against the work piece with full force, by the drive device, if the drive device is not shut off in timely manner. Finally, forces that act on the tool when it comes up against a barrier, such as an upward projecting edge of the work piece, for example, during the processing process, cannot be reliably measured.

It is therefore the task of the invention to further develop a drive apparatus of the type stated initially, in such a manner that it is less susceptible to breakdown.

This task is accomplished, according to the invention, by means of a drive apparatus having the characteristics of the embodiments described herein. Advantageous further developments are the object of the dependent claims.

The invention is based on the idea that the drive device is not firmly connected with the guide device, but rather is disposed to be movable relative to it. Gravitational force or its inherent weight, acting on it, leads to engagement of the force transfer means. When the tool sits on the work piece and therefore can no longer be moved any further with regard to the guide device, further force application on the carriage by means of the drive device results in a movement of the drive device relative to the guide device. This movement can be measured, so that the zero position in which the tool sits on the work piece can be determined without any additional tactile sensor on the tool. Furthermore, the mobility of the drive device with regard to the guide device prevents the tool from being moved against the work piece at an overly great force.

It is practical if the drive device is attached in the guide device so as to pivot, in limited manner, about a pivot axis that is fixed in place. In this connection, it is preferred that the drive device has a motor and a gear wheel driven by the motor, which gear wheel is disposed at a distance from the pivot axis, and can be pivoted about the pivot axis between the release position and the engagement position, and, in the engagement position, stands in engagement with a toothed rack that runs vertically and is firmly connected with the carriage. It is advantageous if the torque brought about by gravitational force, which acts on the drive device with regard to the pivot axis, pulls the gear wheel downward. If no external forces act on the drive device, it is thus moved into the engagement position by its gravitational force, in that the gear wheel is pivoted downward about the pivot axis, for engagement into the toothed rack. In this connection, it is preferred that the axis of rotation of the gear wheel in the engagement position is disposed at the same height or a greater height than the pivot axis.

It is advantageous if the drive device, in the engagement position, lies against a stop because of its gravitational force. It is practical if a force measurement unit for measuring the force that acts on it is disposed on the stop. When the tool sits on the work piece, a further movement of the first force transfer means brings about lift-off from the stop, which can be measured and defines contact with the work piece or that the zero position has been reached. It is advantageous if the force measurement unit has a strain gage. The force that acts on the stop can be measured using the strain gage. It is also possible that a switch is disposed on the stop, which is triggered when the drive unit makes contact with the stop. This represents a simple measurement possibility with which it can be determined whether or not the drive device is lying against the stop.

It is practical if a spring is disposed between the guide device and the drive device, the reset force of which spring counteracts the force that acts on the stop and compensates it, at least in part, preferably in its entirety. By means of this measure, the force that can be transferred from the drive unit to the tool when the tool sits on the work piece is minimized, so that the risk of damage to the tool is further reduced.

The alternative embodiment is based on the idea that the carriage is not guided in a rigid guide device, as in the state of the art, but rather in a guide device that can give way to forces that act on the tool horizontally. Such horizontal forces can occur, for example, when a cutting tool comes up against a barrier, such as an edge that projects up from the work piece, during the cutting process. Such strong contact of the tool with a barrier can damage not only the tool but also the guide device. This risk is reduced if the guide device has a floating bearing having at least one floating bearing element that is movable counter to a reset force. Furthermore, expansion of the carriage that is caused by a temperature increase, for example, can be better compensated.

It is practical if the carriage has a toothed rack disposed between the guide rails, into which a gear wheel driven by the drive device engages to move the carriage. This has the advantage that the force flow during drive of the carriage always takes place in a defined force plane spanned by the guide rails.

It is advantageous if the drive device has a force measurement device for measuring the force that is transferred from the carriage to the at least one floating bearing element. The force with which the tool comes up against the barrier can thereby be precisely determined. If this force exceeds a predetermined value, emergency shut-off can take place, in order to prevent damage to the drive apparatus or to the tool.

It is practical if the at least one floating bearing element is a roller mounted so as to rotate about an axis of rotation that runs horizontally. It is advantageous if the roller has a circumferential notch that is essentially U-shaped or V-shaped and widens in the radial direction, to accommodate the second guide rail. The second guide rail is then not only guided in its longitudinal direction by the roller, but is also fixed in place in the transverse direction that runs parallel to the axis of rotation of the roller. The force in the transverse direction can also be measured by means of a force measurement device. Preferably, the force measurement device measures both force components, in other words the components in the radial and the axial direction.

According to a preferred embodiment, the fixed bearing and the floating bearing each have two rotating rollers that can rotate about axes of rotation that run parallel to one another. The axis of rotation of the at least one roller of the floating bearing can be mounted so as to be linearly displaceable in the guide device, or can be mounted so as to pivot in the guide device, about a pivot axis that runs parallel to and at a distance from it. It is practical if the reset force can be adapted in that it is adjustable by means of biasing at least one reset spring.

Figure 2:
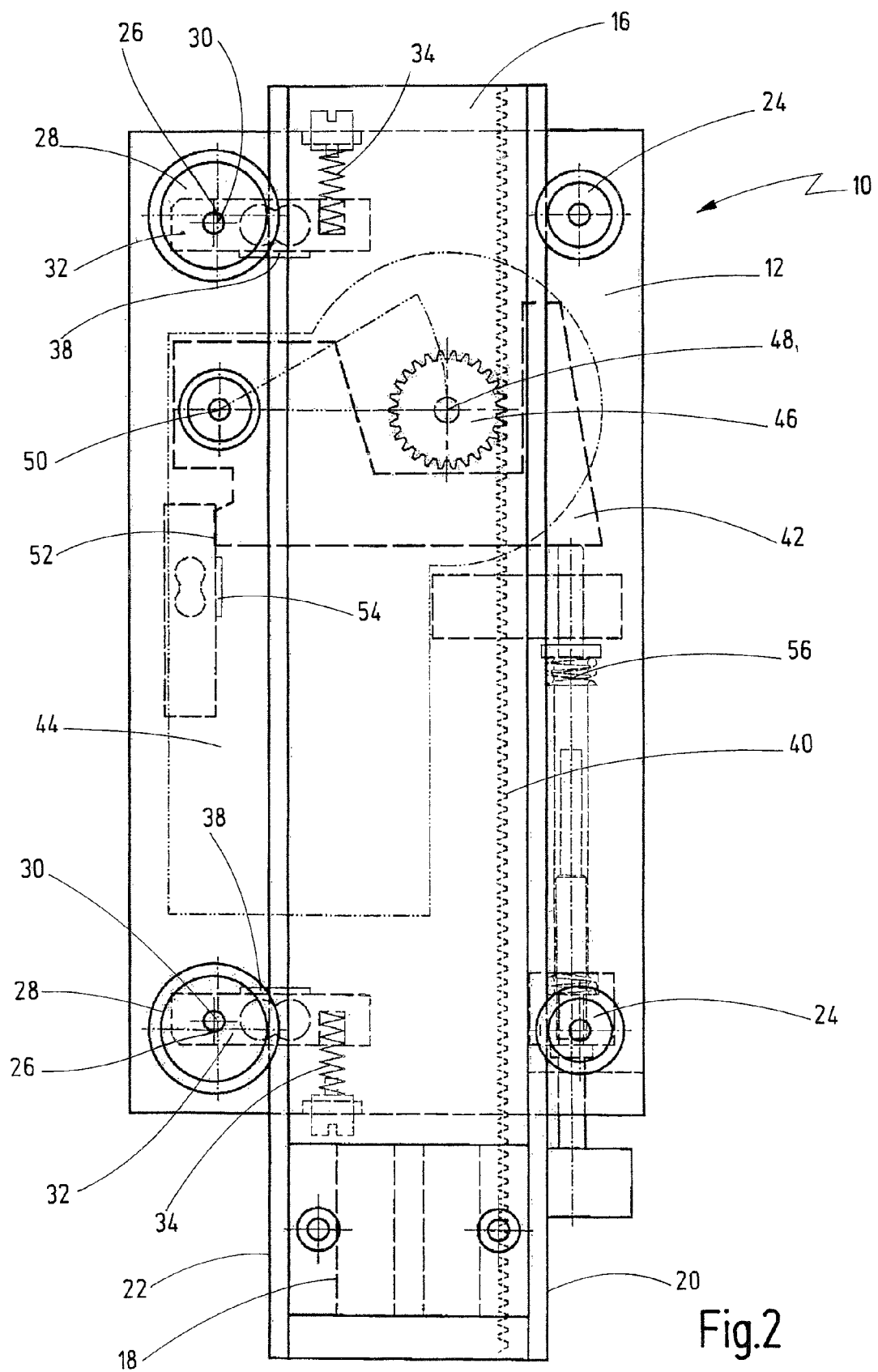
Figure 3:
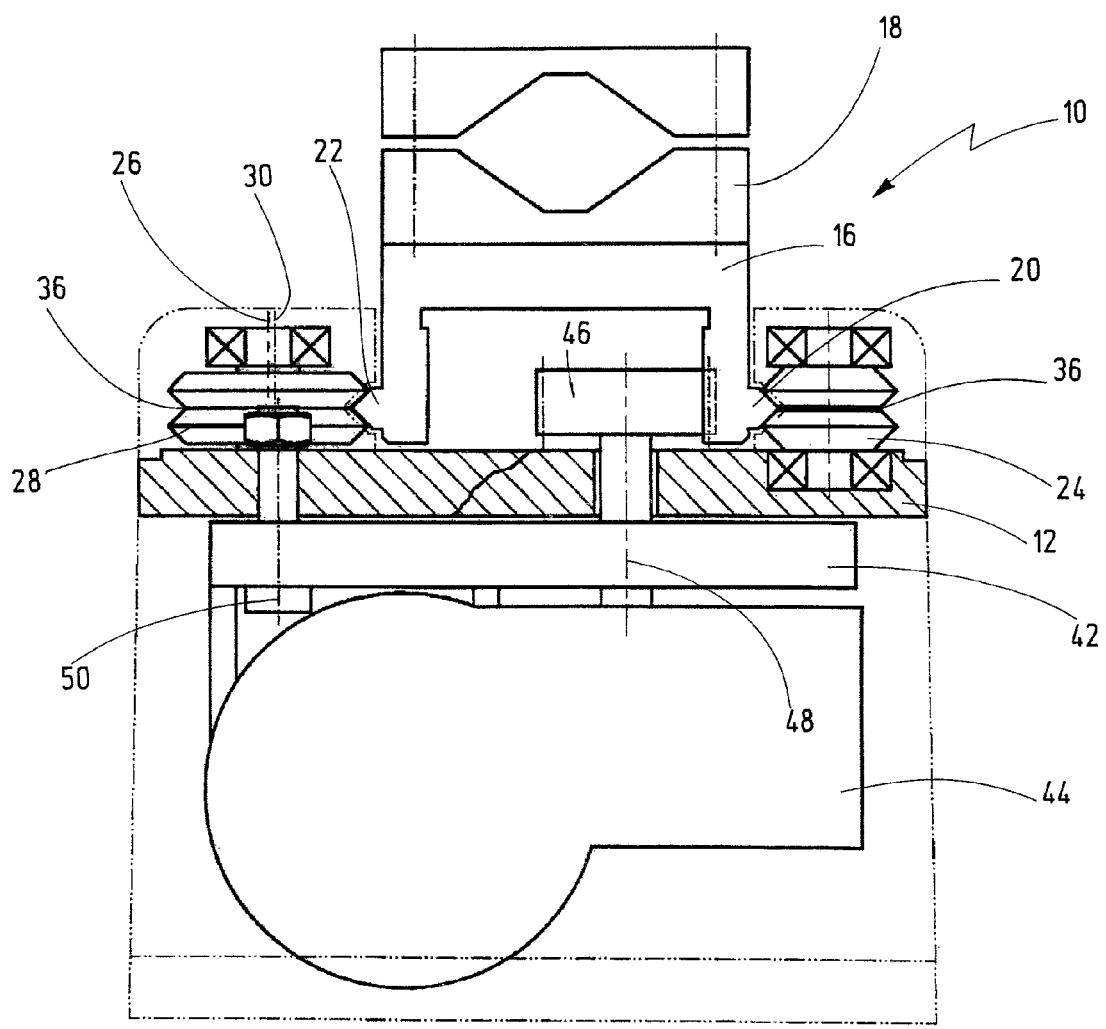

In the following, the invention will be described in greater detail using an exemplary embodiment shown schematically in the drawing. This shows:

FIG. 1 a perspective representation of a drive apparatus, partly cut open;

FIG. 2 a schematic representation to illustrate the method of operation of the drive apparatus according to FIG. 1, and FIG. 3 a top view of the drive apparatus according to FIG. 1, from above, partly in section.

The drive apparatus 10 shown in FIGS. 1 to 3 serves for moving a tool, such as a plasma cutting torch, for example, in the vertical direction toward a work piece that is fixed in place underneath the cutting torch. The drive apparatus 10 has a guide device 12 that is firmly fixed in place on a wall 14, which is a component of a stand, for example, by means of screws, as indicated in FIG. 1. A carriage 16 is guided in the guide device 12, so as to move vertically, on which carriage a tool holder 18 is fixed in place, which serves to clamp the plasma cutting torch, not shown in the drawing, in place.

The carriage 16 has two guide rails 20, 22 that run parallel and at a distance from one another in the vertical direction. To guide the guide rails 20, 22, the guide device 12 has a fixed bearing having two guide rollers 24 that are mounted fixed in place, so as to rotate, at a distance from one another (FIG. 2), against which the first guide rail 20 makes contact. Furthermore, the guide device 12 has a floating bearing having two guide rollers 28 that are disposed at a distance from one another and can rotate about axes of rotation 26, against which the second guide rail 22 makes contact. The guide rollers 28 of the floating bearing are affixed, in each instance, on a lever 32 mounted so as to pivot about a fixed pivot axis 30, in the guide device 12, whereby the pivot axes 30 and the axes of rotation 26 are parallel to one another, but do not coincide. The levers 32 are held by reset springs 34, when no horizontal external forces act on the carriage, in such a position that the axes of rotation 26 of the guide rollers 28 of the floating bearing and the axes of rotation of the guide rollers 24 of the fixed bearing span a rectangle (FIG. 2) in a top view. The guide rollers 28 of the floating bearing can be moved in a direction away from the guide rollers 24 of the fixed bearing, counter to the reset force of the reset springs 34. Temperature-related dimension changes of the carriage 16, for example, can be compensated by means of this movable mounting. Furthermore, it is possible to deflect the carriage 16 partway in the horizontal direction if the cutting torch comes up against a barrier, thereby reducing the risk of damage to the cutting torch or to the carriage.

Each of the guide rollers 24, 28 has a V-shaped notch 36 that widens in the radial direction, into which one of the guide rails 20, 22 engages, in each instance, as illustrated in FIG. 3. For this purpose, the guide rails 20, 22 have a guide contour configured complementary to the notches 36, which is V-shaped in cross-section. If force is applied to the carriage 16 perpendicular to its front surface, this geometry also leads to the result that the guide rollers 28 of the floating bearing escape partway, counter to the force of the reset springs 34. The force that acts on the carriage 16 in the horizontal direction and is transferred to the floating bearing can be measured by means of a force measurement device. This device has two strain gages 38, one of which is affixed to each of the two levers 32, in each instance. The strain gages 38 measure the force that acts in the horizontal direction, whereby both components, in other words the component perpendicular to the pivot axis 30, in each instance, and the component parallel to the pivot axis 30, are measured.

The forces measured by means of the strain gages 38 indirectly characterize the forces applied by the reset springs 34. By means of this measure, emergency shut-off can take place, for example, during movement of the drive apparatus 10 at a constant distance above a work piece surface, if the cutting torch comes up against a barrier at an overly great force.

In order to move the carriage 16 in the vertical direction, a toothed rack 40 that extends in the vertical direction is disposed between the guide rails 20, 22, which rack is firmly connected with the first guide rail 20. A drive device 42 is disposed in the guide device 12, which device has a motor 44 and a gear wheel 46 driven by the motor 44, which gear wheel can rotate about an axis of rotation 48. The drive device 42 is mounted so as to pivot about a pivot axis 50 that runs horizontally and is mounted in a fixed location in the guide device 12, in such a manner that it can be pivoted between an engagement position, shown in the drawing, in which the gear wheel 46 is in engagement with the toothed rack 40, and a release position in which the engagement is cancelled out. The drive device 42 forms a lever mounted in the guide device 12 so as to pivot about the pivot axis 50, in the longer lever arm of which lever the axis of rotation 48 of the gear wheel 46 is disposed, so that the torque brought about by gravitational force pulls the gear wheel 46 downward with regard to the pivot axis 50, from the release position into the engagement position shown in the drawing. In the case of a movement of the carriage 16 downward, if the cutting torch is sitting on the work piece and further movement of the carriage 16 is not possible, the drive device 42 is pivoted about the pivot axis 50, counter to the clockwise direction, by means of the rotation of the gear wheel 46, so that the full drive force of the motor 44 can no longer be transferred to the toothed rack and thus to the carriage 16. Instead, only the force that results from the torque of the drive device 42 with regard to the pivot axis 50 is transferred to the toothed rack 40.

In the engagement position shown in the drawing, in which the axis of rotation 48 of the gear wheel 46 is situated at the same height as the pivot axis 50, the drive device 42 lies against a stop 52. The stop 52 is formed by a bar on which a force measurement unit 54 in the form of a strain gage is disposed, to measure the force that acts on it. The force that acts on the stop 52 is reduced as soon as the cutting torch is sitting on the work piece and the rotation of the gear wheel 46 brings about pivoting of the drive device 42 about the pivot axis 50. This is measured by the strain gage 54. A change in the force that acts on the stop 52 thus characterizes that the cutting torch is sitting on the work piece, and thus that the zero position has been reached, in which the distance between the cutting torch and the work piece is zero. The force that acts on the stop 52 is partly or completely compensated by the reset force of a spring 56, which is disposed between the guide device 12 and the drive device 42. The compensation can be adjusted manually, or can be regulated to a predetermined value by a motor, by way of a closed control circuit. In this way, the fact that the force that acts on the stop during the processing process, as the result of feed lines to the tool, is dependent on the set height of the carriage and is not clearly defined.

In summary, the following should be stated:

The invention relates to a drive apparatus 10 for linear movement of a processing tool with regard to a work piece, having a tool holder 18 fixed in place on a carriage 16, for attaching the processing tool, having a guide device 12 that is fixed-in place, in which device the carriage 16 is guided vertically in linearly displaceable manner, and having a drive device 42 that has a first force transfer means 46 that stands in engagement with a second force transfer means 40 connected with the carriage 16, in an engagement position for movement of the carriage 16. According to the invention, it is provided that the drive device 42 is mounted in the guide device 12 so that it can move between a release position, in which the force transfer means 40, 46 are not in engagement with one another, and the engagement position, in such a way that the gravitational force of the drive device 42 brings about a movement from the release position into the engagement position.

The invention claimed is:

1. A drive apparatus for linear movement of a processing tool with regard to a work piece, having a tool holder fixed in place on a carriage, for attaching the processing tool, having a guide device that is fixed in place, in which device the carriage is guided vertically in linearly displaceable manner, and having a drive device that has a first force transfer device that stands in engagement with a second force transfer device connected with the carriage, in an engagement position for movement of the carriage, wherein the drive device is mounted in the guide device so that the drive device is movable between a release position, in which the first and second force transfer devices are not in engagement with one another, and the engagement position, in such a way that the gravitational force of the drive device brings about a movement from the release position into the engagement position, and wherein the drive device is attached to the guide device so as to pivot, in limited manner, about a pivot axis that is fixed in place.

2. Drive apparatus according to claim 1, wherein the drive device has a motor and a gear wheel driven by the motor, which gear wheel is disposed at a distance from the pivot axis, and can be pivoted about the pivot axis between the release position and the engagement position, and, in the engagement position, stands in engagement with a toothed rack that runs vertically and is firmly connected with the carriage.

3. Drive apparatus according to claim 2, wherein the axis of rotation of the gear wheel in the engagement position is disposed at the same height or a greater height than the pivot axis.

4. Drive apparatus according to claim 2, wherein the torque brought about by gravitational force, which acts on the drive device with regard to the pivot axis, pulls the gear wheel downward.

5. Drive apparatus according to claim 1, wherein the drive device lies against a stop in the engagement position, due to its gravitational force.

6. Drive apparatus according to claim 5, wherein a force measurement unit for measuring the force that acts on it is disposed on the stop.

7. Drive apparatus according to claim 6, wherein the force measurement unit has a strain gage.

8. Drive apparatus according to claim 5, further comprising a switch that is triggered when the drive device makes contact with the stop.

9. Drive apparatus according to claim 5, wherein a spring is disposed between the guide device and the drive device, the reset force of which spring counteracts the force that acts on the stop and compensates it, at least in part.

10. Drive apparatus according to claim 1, wherein the carriage has two guide rails that run parallel and at a distance from one another, and wherein the guide device has a fixed bearing, which is fixed in place, having at least one fixed bearing element, against which a first one of the guide rails makes contact; as well as a floating bearing having at least one floating bearing element, disposed at a distance from the fixed bearing, against which the second guide rail makes contact, and which can be moved away, counter to a reset force, from the at least one fixed bearing element.

11. Drive apparatus according to claim 10, wherein the reset force is adjustable, preferably manually, via biasing at least one reset spring.

12. Drive apparatus according to claim 10, wherein the carriage has a toothed rack disposed between the guide rails, which engages into a gear wheel driven by the drive device, to move the carriage.

13. Drive apparatus according to claim 10, further comprising a force measurement device for measuring the force transferred from the carriage to the at least one floating bearing element.

14. Drive apparatus according to claim 10, wherein the at least one floating bearing element is a roller mounted so as to rotate about an axis of rotation that runs horizontally.

15. Drive apparatus according to claim 14, wherein the roller has a circumferential notch that is essentially U-shaped or V-shaped and widens in the radial direction, to accommodate the second guide rail.

16. Drive apparatus according to claim 14, wherein the fixed bearing and the floating bearing each have two rollers that can rotate about axes of rotation that run parallel to one another, in each instance.

17. Drive apparatus according to claim 14, wherein the axis of rotation of the at least one roller of the floating bearing is mounted in the guide device in linearly displaceable manner.

18. Drive apparatus according to claim 14, wherein the axis of rotation of the at least one roller of the floating bearing is mounted in the guide device so as to pivot about a pivot axis that runs parallel to and at a distance from it.

19. Drive apparatus according to claim 14, further comprising a force measurement device for measuring the force component that acts on the roller of the floating bearing, parallel to the axis of rotation.

20. Drive apparatus for linear movement of a processing tool with regard to a work piece, having a tool holder fixed in place on a carriage, for attaching the processing tool, wherein the carriage has two guide rails that run parallel and at a distance from one another, and having a guide device that is fixed in place, in which device the carriage is guided vertically in linearly displaceable manner, with its guide rails wherein the guide device has a fixed bearing, which is fixed in place, having at least one fixed bearing element, against which a first one of the guide rails makes contact, as well as a floating bearing having at least one floating bearing element, disposed at a distance from the fixed bearing, against which the second guide rail makes contact, and which can be moved away, counter to a reset force, from the at least one fixed bearing element.

\* \* \* \* \*